United States Patent [19]

Shekleton et al.

[11] Patent Number: 4,955,202
[45] Date of Patent: Sep. 11, 1990

[54] HOT GAS GENERATOR

[75] Inventors: Jack R. Shekleton, San Diego; Robert W. Smith, Lakeside, both of Calif.

[73] Assignee: Sundstrand Corporation, Rockford, Ill.

[21] Appl. No.: 324,806

[22] Filed: Mar. 12, 1989

[51] Int. Cl.$^5$ .............................................. F23R 3/42
[52] U.S. Cl. ....................................... 60/753; 60/760; 126/151
[58] Field of Search ................. 60/753, 748, 760, 752; 126/144, 148, 151

[56] References Cited

U.S. PATENT DOCUMENTS

| | | |
|---|---|---|
| 1,828,784 | 10/1931 | Perrin . |
| 2,988,886 | 6/1961 | Hamm et al. ........................ 60/752 |
| 3,982,392 | 9/1976 | Crow . |
| 4,030,875 | 6/1977 | Grondahl et al. . |
| 4,201,047 | 5/1980 | Warren et al. . |
| 4,288,980 | 9/1981 | Ernst . |
| 4,302,941 | 12/1981 | DuBell ................................ 60/757 |
| 4,441,324 | 4/1984 | Abe et al. . |
| 4,567,730 | 2/1986 | Scott ..................................... 60/753 |
| 4,614,082 | 9/1986 | Sterman et al. .................. 60/39.32 |
| 4,655,044 | 4/1987 | Dierberger et al. ................ 60/753 |
| 4,709,643 | 12/1987 | Moreno et al. . |

FOREIGN PATENT DOCUMENTS 791051  2/1958  United Kingdom ................ 60/752

*Primary Examiner*—Louis J. Casaregola
*Assistant Examiner*—Timothy S. Thorpe
*Attorney, Agent, or Firm*—Wood, Phillips, Mason, Recktenwald & Vansanten

[57] ABSTRACT

Improved performance in a hot gas generator 10 is achieved by providing a pair of hemispherical liners 22 and 24 loosely positioned within an interior wall 14 of a vessel 12 so as to be disposed above a combustion chamber 20 therein. The hemispherical liners 22 and 24 normally have a groove 26 at an interface therebetween and are formed of a material adapted to thermally expand under heat. Specifically, the hemispherical liners 22 and 24 expand to close the groove 26 at the interface in a manner producing relatively little stress thereon.

12 Claims, 2 Drawing Sheets

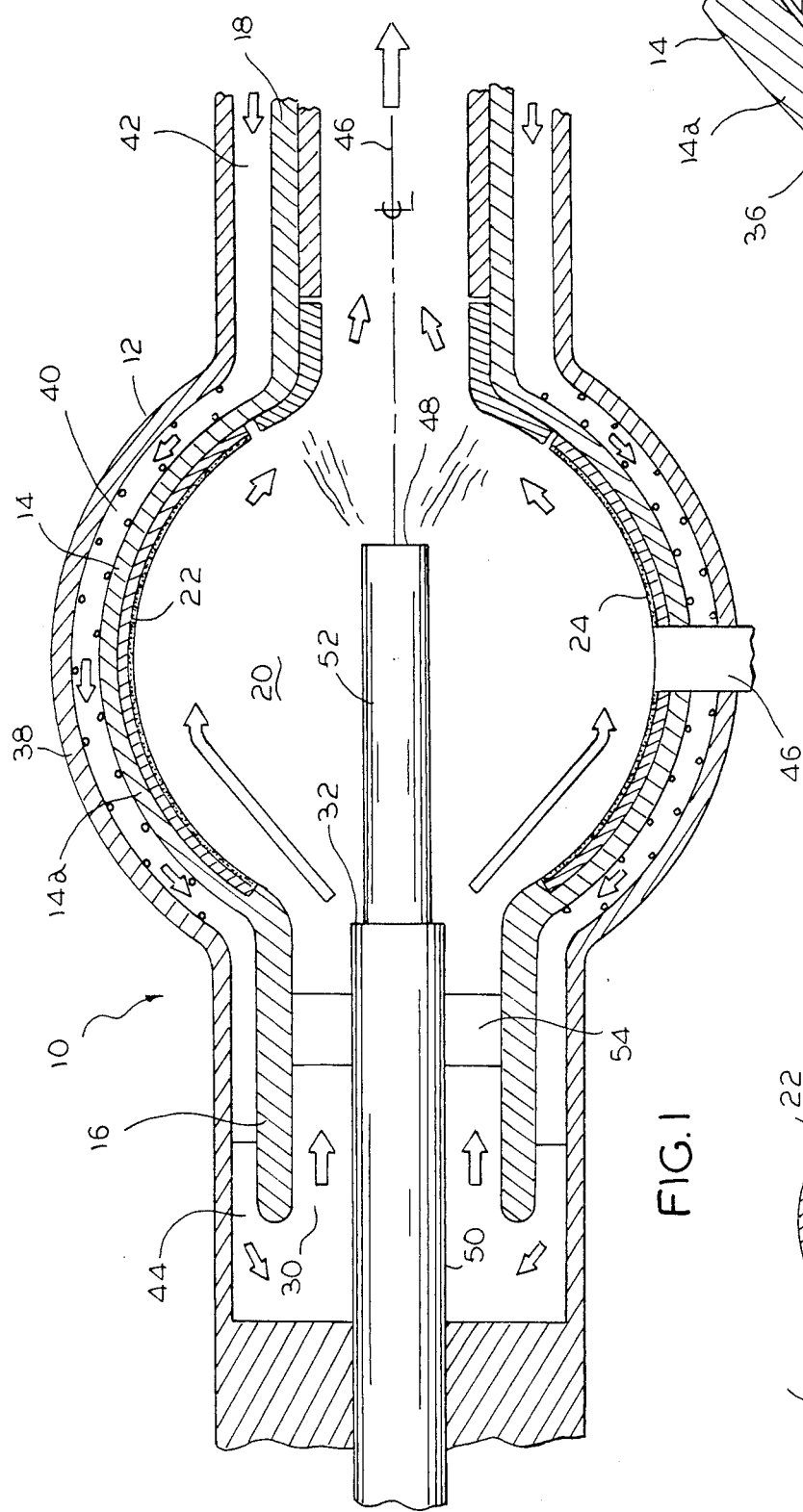
FIG.1
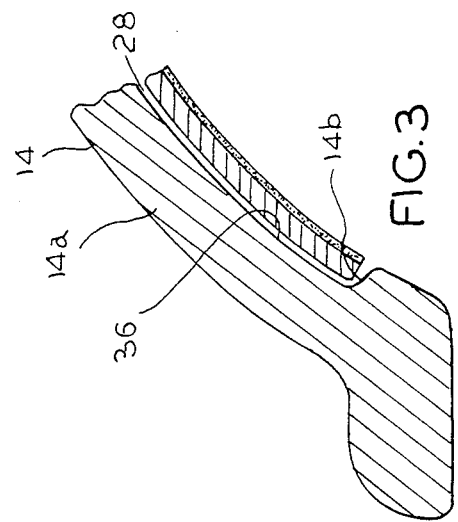
FIG.2
FIG.3

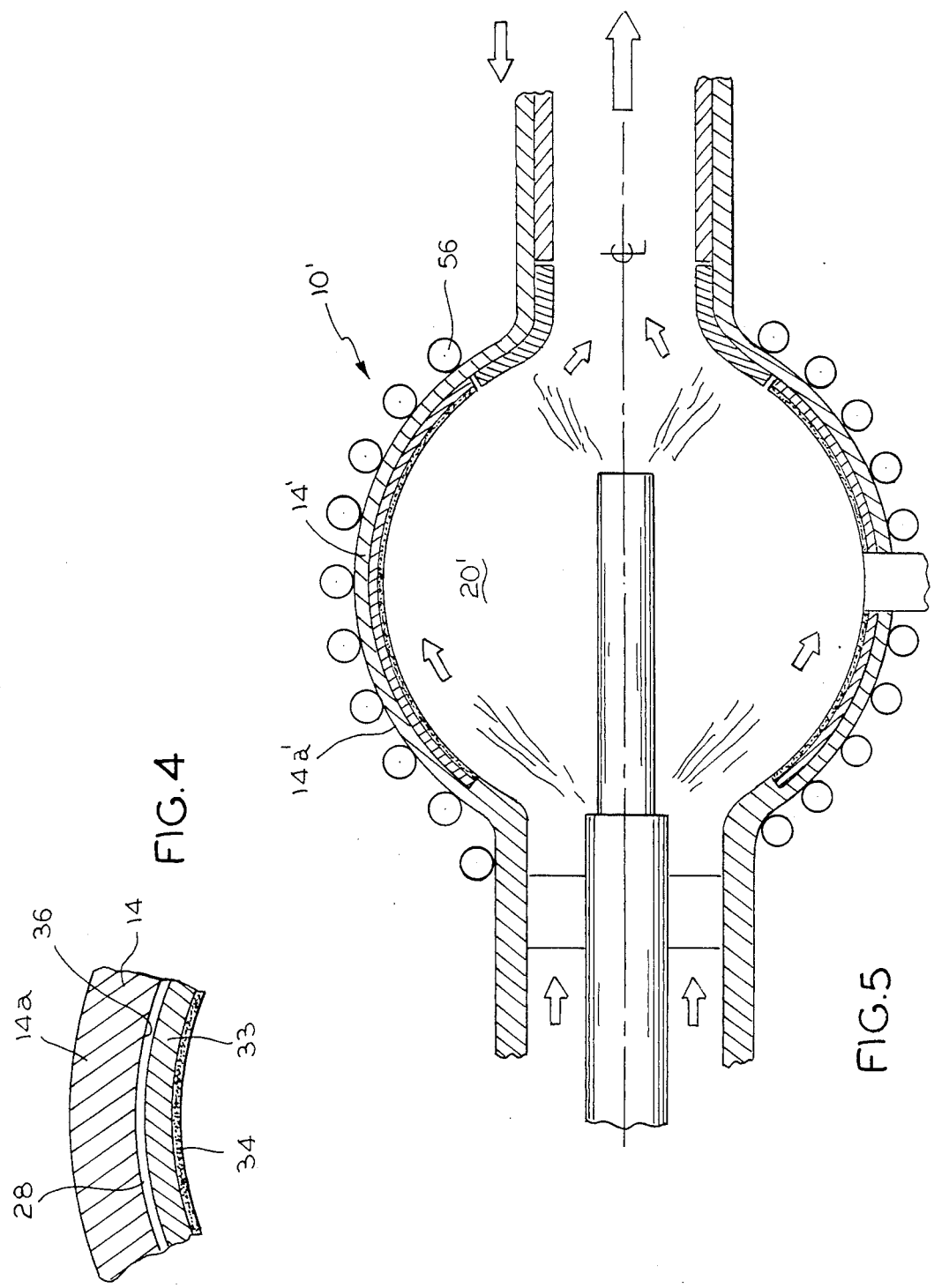

HOT GAS GENERATOR

FIELD OF THE INVENTION

The present invention relates to a generator for producing hot gases as, for example, might be employed to drive a turbine wheel.

BACKGROUND OF THE INVENTION

Hot gas generators have long been utilized for producing hot gas under pressure to operate engines of various types as well as for other purposes. In such hot gas generators, a carbonaceous fuel is combusted with an oxidant to produce hot gases of combustion, and additional fuel may typically be introduced into the hot gases of combustion to be vaporized, or partly decomposed, or both. By so doing, the volume of hot gas can be increased while bringing the temperature of the combustion gas down to a temperature incapable of causing damage to the system in which the generator is used.

One difficulty in the operation and use of such hot gas generators is carbon buildup which results when the fuel is not complete oxidized and elemental carbon is formed within the combustion chamber of the generator. It is important to keep the internal walls of the combustion chamber hot so that the diffusion of carbon to the walls and adherence of carbon on the walls is minimized. Also, carbon buildup can be avoided by providing an excess of oxidant within the combustion chamber but this necessarily results in excessive consumption of oxidant during operation of the hot gas generator.

As a result, there is ordinarily a plentiful supply of liquid fuel in most cases. It is thus conventional practice to run a hot gas generator on the rich side so that all available oxidant is consumed during combustion to thereby minimize oxidant consumption. However, by so doing, the potential for carbon buildup is increased.

As pointed out in Perrin U.S. Pat. No. 1,828,784, issued Oct. 27, 1931, it is also desirable to cool the combustion chamber to prevent damage thereto by excessive heat from combustion occurring therein. Advantageously, this is accomplished by cooling the combustion chamber with fuel, but the fuel may get overly hot causing gumming up leading to rapid failure and, furthermore, the fuel starts to boil which makes fuel injector design difficult and causes serious control system instabilities. At lower power settings, this fuel overheating is particularly troublesome because the low pressure in the combustion chamber results in fuel boiling at lower temperatures.

From the foregoing, it should be clear that there are two fundamental considerations. First, the internal walls of the combustion chamber must be at a maximum temperature. Second, the heat flux through the internal walls must be minimal. In this manner, carbon buildup can be avoided while providing the necessary cooling.

As will be appreciated, carbon buildup is undesirable because it may interfere with heat transfer, but another problem resulting from carbon buildup is much more serious. Specifically, hot gas generators are frequently used to produce hot gases for driving turbine wheels. As carbon builds up, particles thereof typically break free and then flow with the hot gas through the turbine wheel. Unfortunately, particulate carbon erodes the turbine nozzles and the turbine wheels. Furthermore, carbon deposits can build up on the surfaces of the turbine nozzles and restrict the flow to performance losses.

The hot gas generators disclosed in commonly owned and copending applications Ser. No. 123,303, filed Nov. 20, 1987 and Ser. No. 272,409, filed Nov. 17, 1988 (Attorney Docket No. Bo2902-AT6) avoid many of these difficulties. Thus, they are recognized as highly advantageous. Nonetheless, improvements in terms of simplifying the construction of the hot gas generator, assuring full and complete vaporization of fuel therewithin, and ensuring hot internal walls with minimal heat flux therethrough are desirable.

The present invention is directed to overcoming one or more of the foregoing problems and providing one or more of the suggested improvements.

SUMMARY OF THE INVENTION

It is the principal object of the invention to provide a new and improved hot gas generator. More specifically, it is an object of the invention to provide a hot gas generator that is constructed with a unique liner or shield positioned therewithin and about a combustion chamber. It is also an object of the invention to provide a liner or shield which is formed of a composite material.

An exemplary embodiment of the invention achieves the foregoing in a hot gas generator comprising a vessel having an interior wall defining narrow, spaced apart inlet and outlet ends interconnected by a relatively wide, generally spherical combustion chamber. The generator includes a pair of hemispherical liners loosely positioned within the interior wall so as to be disposed about the combustion chamber. The hemispherical liners normally have a groove at an interface therebetween and are formed of a material adapted to thermally expand under heat so as to close the groove at the interface in a manner producing relatively little stress thereon. The generator also includes an oxidant inlet port at the inlet end of the interior wall and a fuel discharge port for directing fuel into the combustion chamber. With this arrangement, the hemispherical liners may advantageously be formed of metal having a coating of ceramic defining an inner surface that faces the combustion chamber.

According to one aspect of the invention, the portion of the interior wall defining the combustion chamber includes a generally spherical recess. This recess is advantageously sized to loosely receive the hemispherical liners so as to accommodate the thermal expansion thereof. Further, the vessel may typically have an exterior wall in closely spaced relation to the interior wall to define an oxidant flow path therebetween.

With this arrangement, oxidant may flow between the interior and exterior walls from adjacent the outlet end to the oxidant inlet port at the inlet end of the interior wall. This will provide cooling of the interior wall outwardly of the liners while allowing the introduction of oxidant upstream of the fuel discharge port. Later, the oxidant and fuel will be mixed in the combustion chamber where it will then be ignited in order to produce the hot gases therein.

In a highly preferred embodiment, the vessel has a longitudinal axis extending from the inlet end through the combustion chamber to the outlet end with the oxidant inlet port being disposed so as to be concentric with the longitudinal axis of the vessel. More specifically, the oxidant inlet port is concentric with the longitudinal axis at the inlet end of the interior wall whereas the fuel discharge port is also disposed so as to be concentric with the longitudinal axis of the vessel but downstream of the inlet end at the combustion chamber. Preferably, there are a pair of fuel discharge ports with one of them being disposed adjacent the inlet end and the other of them being disposed within the combustion chamber and upstream of the outlet end to thereby define what can be referred to as a dual fuel injector.

In this connection, the dual fuel injector is preferably defined by a pair of concentric fuel supply tubes on the longitudinal axis with the one of the fuel discharge ports being disposed in the outermost one of the tubes and the other of the fuel discharge ports being disposed in the innermost one of the tubes. With this arrangement, the outermost one of the fuel supply tubes is suitably adapted to inject fuel into the combustion chamber from the inlet side thereof whereas the innermost one of the fuel supply tubes is adapted to inject fuel into the combustion chamber in the vicinity of the outlet side thereof.

Other objects, advantages and features of the present invention will become apparent from a consideration of the following specification taken in conjunction with the accompanying drawings.

BRIEF DESCRIPTION OF THE DRAWINGS

FIG. 1 is a partially schematic, partially sectional view of a hot gas generator in accordance with the present invention;

FIG. 2 is a cross sectional view of a pair of hemispherical liners or shields for the hot gas generators illustrated in FIG. 1;

FIG. 3 is a longitudinal cross sectional view illustrating the relationship between the hemispherical liners or shields and an interior wall of a vessel defining the hot gas generator illustrated in FIG. 1;

FIG. 4 is an enlarged cross sectional view of the hemispherical liner or shield and interior wall illustrating a composite material for the liner or shield; and FIG. 5 is a partially schematic, partially sectional view of an alternative embodiment of hot gas generator in accordance with the present invention.

DETAILED DESCRIPTION OF THE PREFERRED EMBODIMENTS

Referring to the drawings, and first to FIG. 1, the reference numeral 10 designates generally a hot gas generator comprising a vessel 12 having an interior wall 14 defining narrow, spaced apart inlet and outlet ends 16 and 18 interconnected by a relatively wide, generally spherical combustion chamber 20. The hot gas generator 10 includes a pair of hemispherical liners or shields 22 and 24 loosely positioned within the interior wall 14 so as to be disposed about the combustion chamber 20. The hemispherical liners or shields 22 and 24 normally have a groove as at 26 (see FIG. 2) at an interface therebetween as well as a space as at 28 (see FIG. 3) between the liners or shields 22 and 24 and inner wall 14 and are formed of a material adapted to thermally expand under heat so as to close the groove as at 26 and the space as at 28 in a manner producing relatively little stress thereon. The hot gas generator 10 also includes an oxidant inlet port as at 30 at the inlet end 16 of the interior wall 14 and a fuel discharge port as at 32 for directing fuel into the combustion chamber 20. Preferably, the material of the hemispherical liners is a metal as at 33 which can suitably be coated with ceramic as at 34 wherein the coating of ceramic as at 34 defines an inner surface of the hemispherical liners or shields 22 and 24 facing the combustion chamber 20.

As will be appreciated by referring to FIGS. 1 and 3, the portion 14a of the interior wall 14 defining the combustion chamber 20 includes a generally spherical recess as at 36 which is sized so as to loosely receive the hemispherical liners or shields 22 and. 24 (see, in particular, FIG. 3). With this arrangement, the generally spherical recess 36 can readily accommodate thermal expansion both radially outwardly toward the interior wall portion 14a and circumferentially toward the ends 14b of the interior wall portions 14a defining the generally spherical recesses 36.

As shown in FIG. 1, the vessel 12 also includes an exterior wall 38 in closely spaced relation to the interior wall 14 to define an oxidant flow path 40 therebetween. Thus, oxidant can flow from a source into the oxidant flow path 40 as at 42 completely about the region of the combustion chamber 20 and to the end 44 of the oxidant flow path 40 where it can reverse direction so as to pass through the oxidant inlet port 30 at the inlet end 16 of the interior wall 14. Thereafter, oxidant can flow into the combustion chamber 20 where it is mixed with fuel from the fuel discharge port 32 to be combusted therein.

Still referring to FIG. 1, it will be appreciated that the vessel 12 has a longitudinal axis 46 which extends from the inlet end 16, completely through the combustion chamber 20, and through the outlet end 18 of the hot gas generator 10. The oxidant inlet port 30 is disposed so as to be concentric with the longitudinal axis 46 of the vessel 12 at the inlet end 16 whereas the fuel discharge port 32 is also disposed so as to be concentric with the longitudinal axis 46 of the vessel 12 at a point downstream of the oxidant inlet port 30 at the combustion chamber 20. As a result, oxidant flows generally axially along the oxidant flow path 40 from the outlet end 18 to the inlet end 16 and then entirely reverses direction to flow generally axially from the inlet end 16 toward the outlet end 18.

With this arrangement, oxidant is available to cool the interior wall 14 as it flows along the oxidant flow path 40. It is then available in the combustion chamber 20 to be mixed with fuel from the fuel discharge port 32 and then combusted by means of an igniter 47 in the combustion chamber 20. Once the fuel and oxidant have been combusted, the hot gases can pass through the outlet end 18 to, e.g., drive a turbine wheel.

If desired in a particular application, the hemispherical liners or shields 22 and 24 can be formed solely of a metal having the desired thermal expansion characteristics. It may be advantageous in many applications, however, for the liners or shields 22 and 24 to comprise a composite material in order to provide the ceramic coating 34 as an inner surface facing the combustion chamber 20 which will remain quite hot in order to minimize carbon buildup while also minimizing heat flux through the interior wall 14. By utilizing liners or shields 22 and 24 separate from the interior supporting or structural wall 14, it is possible to accomplish these objectives.

Because of the spacing between the liners or shields 22 and 24 and the interior wall 14, the temperature drop can be significantly large and appreciably adjustable to thereby reduce the heat flux to the interior wall 14.

Also, the ceramic coating 34 can be utilized because the liners or shields 22 and 24 comprise relatively thin innwardly facing walls. Thus, while it is known that such coatings tend to crack or spall off when applied to massive structural supporting walls, the fact that the liners or shields 22 and 24 are applied to thin, non-structural walls essentially free of stress minimizes such problems. Moreover, without the need for concern over stress, a wider choice of materials is available to minimize such crack and spall problems since the only concern is oxidation resistance.

Preferably, the hot gas generator 10 includes a second fuel discharge port 48 with the first of the fuel discharge ports 32 then being disposed adjacent the inlet end 16. It will be appreciated that the other of the fuel discharge ports 48 will advantageously be disposed within the combustion chamber 20 and upstream of the outlet end 18. With this arrangement, the fuel discharge ports 32 and 48 define a what may suitably be called a dual fuel injector defined by a pair of concentric fuel supply tubes 50 and 52 located on the longitudinal axis 46.

As shown in FIG. 1, one of the fuel discharge ports 32 is disposed in the outermost one of the tubes 50 and the other of the fuel discharge ports 48 is disposed in the innermost one of the tubes 52. It will be seen that the outermost one of the fuel supply tubes 50 is adapted to inject fuel into the combustion chamber 20 from the inlet side thereof and the innermost one of the fuel supply tubes 52 is adapted to inject fuel into the combustion chamber 20 in the vicinity of the outlet side thereof. In addition, an oxidant swirler 54 may be provided upstream of the fuel discharge ports 32 and 48 to control oxidant swirl as oxidant enters the combustion chamber 20.

For additional details on these aspects of the invention, commonly owned and copending application Ser. No. 272,409, filed Nov. 17, 1988, is hereby incorporated by reference.

Referring to FIG. 5, an alternative embodiment of hot gas generator 10' has been illustrated wherein the principal difference relates to the fact that there is only a single wall 14' rather than an interior wall 14 and an exterior wall 38. Cooling is accomplished by means of a fuel supply tube 56 brazed to the wall portion 14a' defining the combustion chamber 20' in typical coil fashion in this embodiment. With this arrangement, the brazed coil fuel supply tube 56 provides cooling to the wall portion 14a' in place of oxidant in the oxidant flow path 40 in the embodiment illustrated in FIG. 1.

With the present invention, the use of a spherical combustor 20 minimizes surface thereby minimizing heat flux to the walls 14 and 14' with the smooth shape minimizing turbulence to further reduce heat flux. Another unique advantage is that by virtue of the laminarization effects of swirl flow the spherical shape is able to further reduce heat flux to the walls 14 and 14'.

While in the foregoing there have been set forth preferred embodiments of the invention, it will be appreciated that the invention is only to be limited by the true spirit and scope of the appended claims.

We claim:
1. A hot gas generator, comprising:
a vessel having a wall defining narrow, spaced apart inlet and outlet ends interconnected by a relatively wide, generally spherical combustion chamber;
a pair of smooth hemispherical liners loosely positioned within said wall so as to be disposed about said combustion chamber, said hemispherical liners normally having a groove at an interface therebetween and being formed of a material adapted to thermally expand radially and circumferentially under heat, said hemispherical liners expanding to close said groove at said interface in a manner producing relatively little stress thereon;
the portion of said wall defining said combustion chamber including a generally spherical recess sized to loosely receive said hemispherical liners so as to accommodate radial and circumferential thermal expansion relative thereto;
an oxidant inlet port at said inlet end of said wall; and
a fuel discharge port for directing fuel into said combustion chamber.

2. The hot gas generator as defined in claim 1 wherein said material of said hemispherical liners is a metal, said metal having a coating of ceramic defining an inner surface of said hemispherical liners, said inner surface of said hemispherical liners facing said combustion chamber.

3. The hot gas generator as defined in claim 1 including cooling means associated with said wall, said cooling means comprising a fuel supply tube on the side thereof opposite said combustion chamber, said fuel supply tube extending about and being joined to said wall in coil fashion.

4. A hot gas generator, comprising:
a vessel having an interior wall defining narrow, spaced apart inlet and outlet ends interconnected by a relatively wide, generally spherical combustion chamber, said vessel also having an exterior wall in closely spaced relation to said interior wall to define an oxidant flow path therebetween;
a pair of smooth hemispherical liners loosely positioned within said interior wall so as to be disposed about said combustion chamber, said hemispherical liners normally having a groove at an interface therebetween and being formed of a material adapted to thermally expand radially and circumferentially under heat, said hemispherical liners expanding to close said groove at said interface in a manner producing relatively little stress thereon;
said interior wall having a generally spherical recess formed in the portion thereof defining said combustion chamber, said generally spherical recess being sized to loosely receive said hemispherical liners so as to accommodate radial and circumferential thermal expansion relative thereto;
an oxidant inlet port at said inlet end of said interior wall; and
a fuel discharge port for directing fuel into said combustion chamber.

5. The hot gas generator as defined in claim 4 wherein said material of said hemispherical liners is a metal, said metal having a coating of ceramic defining an inner surface of said hemispherical liners, said inner surface of said hemispherical liners facing said combustion chamber.

6. The hot gas generator as defined in claim 4 wherein said vessel has a longitudinal axis extending from said inlet end through said combustion chamber to said outlet end thereof, said oxidant inlet port being disposed so as to be concentric with said longitudinal axis of said vessel at said inlet end of said interior wall.

7. The hot gas generator as defined in claim 4 wherein said vessel has a longitudinal axis extending from said inlet end through said combustion chamber to said outlet end thereof, said fuel discharge port being disposed so as to be concentric with said longitudinal axis of said vessel to said combustion chamber.

8. A hot gas generator, comprising:

a vessel having an interior wall defining narrow, spaced apart inlet and outlet ends interconnected by a relatively wide, generally spherical combustion chamber, said vessel also having an exterior wall in closely spaced relation to said interior wall to define an oxidant flow path therebetween;

a pair of smooth hemispherical shields loosely positioned within said interior wall so as to be disposed about said combustion chamber, said hemispherical shields normally having a groove at an interface therebetween and being formed of a composite material adapted to thermally expand radially and circumferentially under heat including an inner surface material capable of withstanding higher temperature than an outer surface material thereof, said hemispherical shields expanding to close said groove at said interface in a manner producing relatively little stress thereon;

said interior wall having a generally spherical recess formed in the portion thereof defining said combustion chamber, said generally spherical recess being sized to loosely receive said hemispherical shields so as to accommodate radial and circumferential thermal expansion relative thereto;

an oxidant inlet port at said inlet end of said interior wall; and a fuel discharge port for directing fuel into said combustion chamber;

said vessel having a longitudinal axis extending from said inlet end through said combustion chamber to said outlet end thereof, said oxidant inlet port being concentric with said longitudinal axis of said vessel at said inlet end of said interior wall, said fuel discharge port also being concentric with said longitudinal axis of said vessel at said combustion chamber.

9. The hot gas generator as defined in claim 8 wherein said outer surface material of said hemispherical shields is a metal, said metal having a coating of ceramic defining said inner surface material of said hemispherical shields, said inner surface material of said hemispherical shields defining a liner facing said combustion chamber.

10. The hot gas generator as defined in claim 8 including a second fuel discharge port, one of said fuel discharge ports being disposed adjacent said inlet end and the other of said fuel discharge ports being disposed within said combustion chamber and upstream of said outlet end, said fuel discharge ports defining a dual fuel injector.

11. The hot gas generator as defined in claim 10 wherein said dual fuel injector is defined by a pair of concentric fuel supply tubes located on said longitudinal axis, the one of said fuel discharge ports being disposed in the outermost one of said tubes and the other of said fuel discharge ports being disposed in the innermost one of said tubes.

12. The hot gas generator as defined in claim 11 wherein the outermost one of said fuel supply tubes is adapted to inject fuel into said combustion chamber from said inlet side thereof and the innermost one of said fuel supply tubes is adapted to inject fuel into said combustion chamber in the vicinity of said outlet side thereof.

* * * * *